(12) United States Patent
Soulalioux et al.

(10) Patent No.: US 6,468,062 B1
(45) Date of Patent: Oct. 22, 2002

(54) RIGID CORE IN TWO PORTIONS FOR THE MANUFACTURE OF TIRES

(75) Inventors: Alain Soulalioux, Saint-Beauzire (FR); Jean-Pierre Ladouce, Fribourg (CH)

(73) Assignee: Sedepro, Paris (FR)

( * ) Notice: Subject to any disclaimer, the term of this patent is extended or adjusted under 35 U.S.C. 154(b) by 0 days.

(21) Appl. No.: 09/636,021

(22) Filed: Aug. 10, 2000

(30) Foreign Application Priority Data

Aug. 10, 1999 (FR) .............................................. 99 10420

(51) Int. Cl.$^7$ .............................................. B29C 33/76
(52) U.S. Cl. .............................. 425/50; 425/54; 425/56
(58) Field of Search .............................. 425/50, 54, 56, 425/57

(56) References Cited

U.S. PATENT DOCUMENTS

| | | | | |
|---|---|---|---|---|
| 1,221,349 A | * | 4/1917 | Merriman ..................... | 425/56 |
| 1,249,033 A | * | 12/1917 | Cobb .......................... | 425/56 |
| 1,303,256 A | * | 5/1919 | Clark et al. .................. | 425/56 |
| 1,389,892 A | * | 9/1921 | Midgley, Sr. ................ | 425/50 |
| 1,810,072 A | | 6/1931 | Denmire ..................... | 156/133 |
| 1,903,458 A | | 4/1933 | Johnson ...................... | 156/417 |
| 4,063,861 A | * | 12/1977 | Schmidt et al. ............... | 425/56 |
| 4,083,672 A | | 4/1978 | Vaishnav ..................... | 425/457 |
| 4,301,850 A | | 11/1981 | Schneider et al. ...... | 152/361 R |
| 4,877,468 A | | 10/1989 | Siegenthaler ............... | 156/111 |
| 4,895,692 A | | 1/1990 | Laurent et al. ............. | 264/326 |

* cited by examiner

*Primary Examiner*—James P. Mackey
(74) *Attorney, Agent, or Firm*—Baker Botts L.L.P.

(57) ABSTRACT

A rigid core at least partially defining a manufacturing form for the internal surface of a tire, the core including a plurality of circumferentially adjacent fractions disposed side by side in contact with one another by their transverse faces, the transverse faces of at least one fraction converging radially at the exterior of the core, each of the fractions including a portion for attachment to a rim, the attachment portion being arranged at the radially internal end of each of the fractions, the attachment portion being produced essentially from a first material, the core further including a main portion which is integrally connected to the attachment portion, is produced essentially from a second material different from the first material and is integrally connected to the attachment portion, the manufacturing form being essentially defined by said main portion.

13 Claims, 3 Drawing Sheets

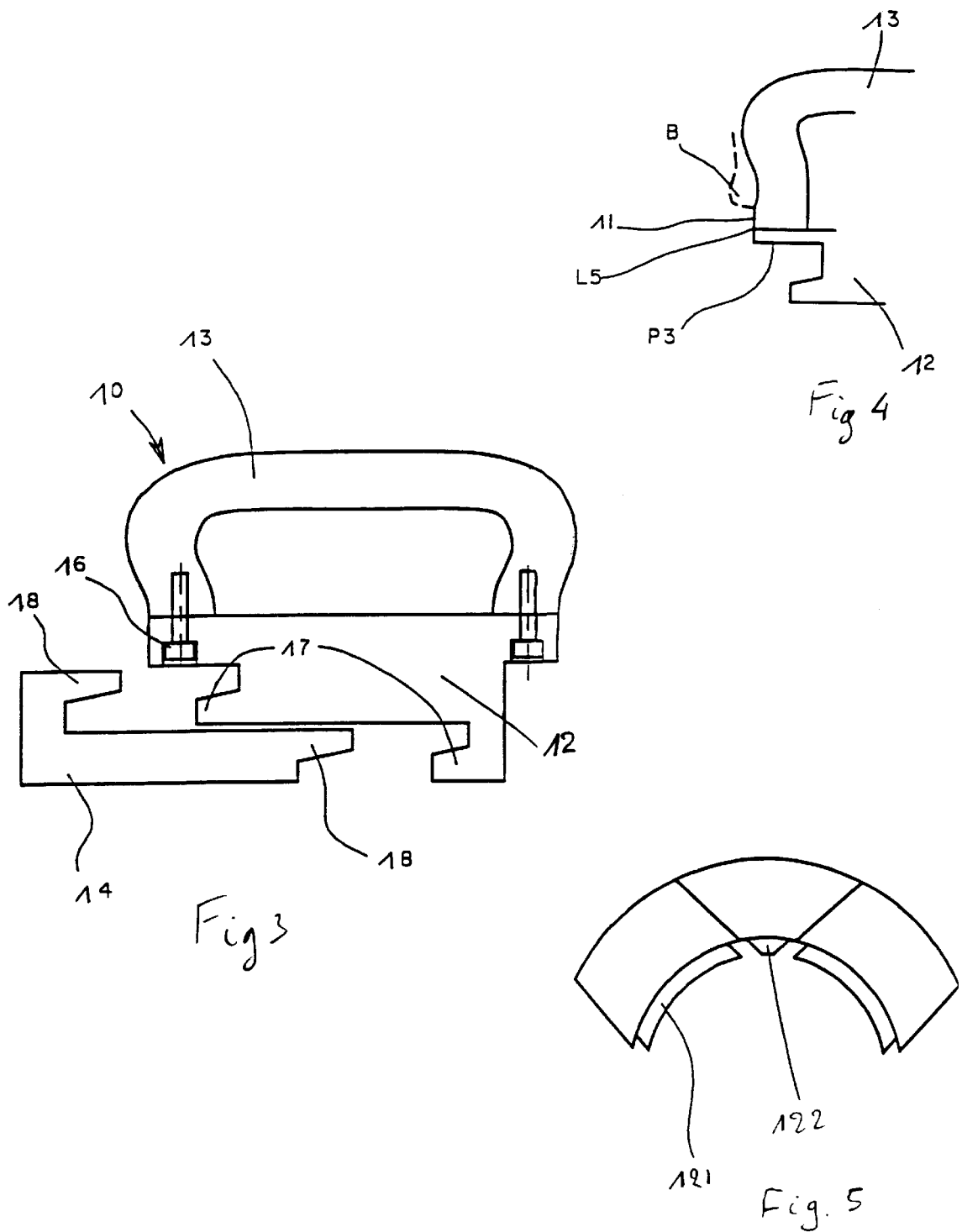

RIGID CORE IN TWO PORTIONS FOR THE MANUFACTURE OF TIRES

BACKGROUND OF THE INVENTION

The present invention concerns the manufacture of tires. More particularly, the present invention relates to a substantially rigid core used as manufacturing support for a tire and as a means for molding the surface of the internal cavity of a tire.

The patent application EP 0 666 165 describes a manufacturing machine which employs such a core as manufacturing support for a tire. A core of this type is removed after the manufacture of each tire and is then reconstituted in order to act as a support for the subsequent manufacture of a further tire. A core of this type has to withstand numerous cycles of mounting and removal. The core has to be extremely robust in order to be able to guarantee a high level of geometric quality, and has to have highly durable geometric qualities over time, despite the considerable handling to which it is subjected. Furthermore, it is proposed in the patent application EP 0 666 165 that a rim be used as member for integrally connecting the various fractions of which a core of this type is necessarily composed.

The problem which arises is therefore to obtain a design of such a core which is sufficiently robust, without affecting, on the one hand, the ease of mounting and removal of this core and, also, without making the conveyance thereof from station to station on the manufacturing machine too complicated. Furthermore, a core of this type must be adapted to the exact form of each of the different tires to be manufactured. It is also desirable to have a certain degree of standardization in such a core so that the machine itself is as universal as possible. It is also expedient to be able to supply heat to the tire to be vulcanized through the core so that vulcanization can be as uniform and fast as possible. Finally, while being as robust as possible and while allowing excellent transmission of heat toward the tire to be vulcanized, a core of this type should be as light as possible in order to allow high acceleration and high speeds of conveyance from station to station.

The object of a rigid core of this type is to define, at least partially, a manufacturing form for the internal surface of a tire. It is known that a core of this type consists of a plurality of fractions to enable it to be extracted from the interior of a tire through the volume available inside the beads. It comprises a plurality of circumferentially adjacent fractions arranged side by side in contact with one another by their transverse faces. The term "transverse faces" denotes the faces running from one side of the core to the other. In the example described, these are plane faces which are parallel to the axis of the core, these characteristics not being limiting. Said transverse faces of at least one fraction converge radially at the exterior of the core. Such a core is shown in U.S. Pat. No. 4,895,692.

The invention proposes that each of these fractions be produced in two distinct portions which each meet their own requirements: an attachment portion and a main portion integrally connected to the attachment portion. The essential role of the main portion is the molding of the internal surface of the tire. The main portion therefore acts as a manufacturing form and molds the internal surface of a tire. The essential role of the attachment portion is to integrally connect the various fractions to a member for integrally connecting said various fractions constituting a core of this type.

Each of said fractions comprises a portion for attachment to a member for integrally connecting said various fractions, said attachment portion being arranged at the radially internal end of each of the fractions. Said attachment portion is essentially produced from a first material selected for its ability to withstand a large number of mounting and removal cycles. The attachment portion is designed to optimize the gripping of each of the fractions by the rim and by the various other handling members which may be provided on the grippers or on each of the stations for use of the core.

Each of said fractions also comprises a main portion integrally connected to said attachment portion, essentially produced from a second material which is different from the first material and is selected for its moldability and its good thermal conductivity. The main portion is integrally connected to said attachment portion, in other words is functionally unremovable. The main portion is produced so as to optimize the molding and vulcanization of the tire and also so as to be as economical as possible to produce because it is a specific part of each dimension of the tire whereas the attachment portion can be produced with identical plans and an identical design for a plurality of different tires.

It should be noted that it is very difficult to produce the crude blank of the tire with the exact form which will be imparted to it by vulcanization and molding. In particular, the lower portion of the bead can have a section which merely approaches the final section. The radially lowest portion of the bead can be located, in the crude state, at a radial level lower than that which will be obtained after molding. As a result, the shell extensions may scrape the radially internal portion of the tire beads somewhat during closure of the mold described in U.S. Pat. No. 4,895,692. In some cases, it can happen during this phase where the shell extensions scrape the still crude bead that they carry off a small portion of rubber which will be removed from the tire blank. This small portion of rubber is pushed back into the interior of the mold and is lost. It soils the mold and/or the press, thus reducing the possible duration of production between two mold and/or press cleaning operations. Furthermore, it risks causing subsequent defects in the appearance of the cured tires if this small portion of rubber pushed back into the interior of the mold is freed and returns into the mold cavity.

SUMMARY OF THE INVENTION

According to the present invention, this problem is solved by reserving the entire molding function to the main portion, no surface of the attachment portion having a molding function. In this case, an intermediate face is disposed in the direct extension, radially toward the smallest radii, in other words toward the interior, of the molding surface of the core. This intermediate face is either disposed in a plane perpendicular to the axis of rotation or forms a truncated cone with a very large angle, depending on the form and orientation of the molding portion. Therefore, if the radially lowest portion of the bead comes to a radial level lower than that of the finished tire, the flash possibly caused by the closure movement of the mold is simply pinched and not sheared off and remains attached to the tire. This prevents the above-described drawbacks.

Also and preferably, the joining line between the attachment portion and the main portion is accommodated in this intermediate surface, and this also prevents the appearance of a flash on the internal surface of the tire bead owing to the creep of the rubber between attachment portion and main portion. A further advantage of this disposition is that the attachment portion, or more specifically all the attachment portions of all the fractions, do not necessarily have to form a continuous surface as these attachment portions do not have a molding function.

Further details and advantages of the invention will be explained hereinafter with reference to the accompanying figures.

DESCRIPTION OF THE DRAWINGS

FIG. 3 is a more detailed side view of a fraction according to a preferred variation of the invention;

FIG. 4 is a partial schematic radial section illustrating an aspect of the invention;

FIG. 5 is a schematic side view of a further variation;

DESCRIPTION OF PREFERRED EMBODIMENTS

Figure 2:
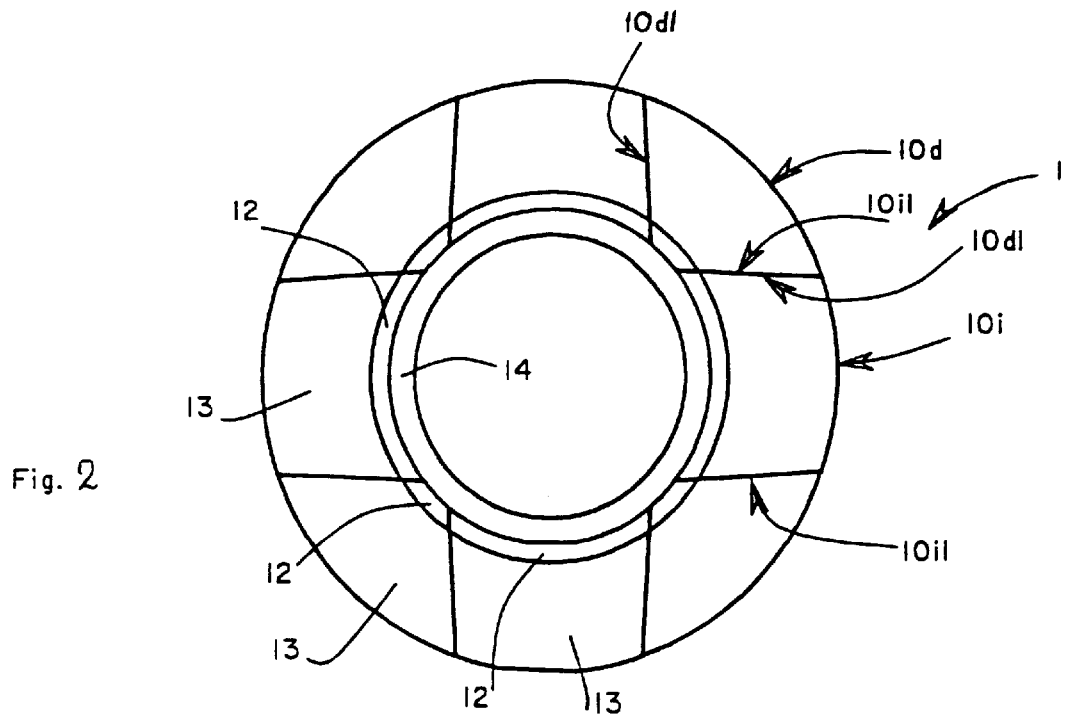
FIG. 2 is a schematic side view of a core according to the invention.
Figure 1:
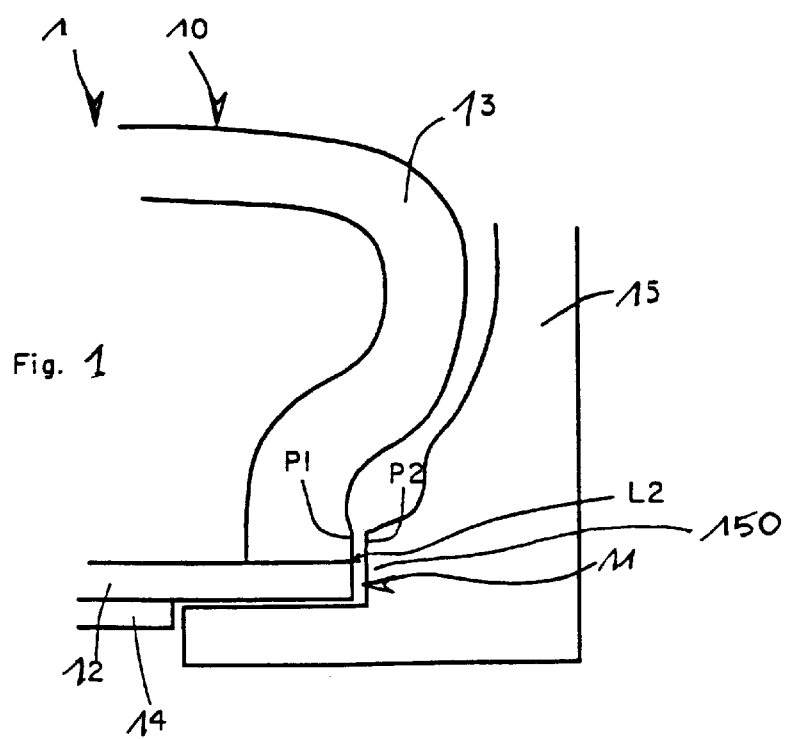
FIG. 1 is a partial schematic radial section of a core combined with a shell to constitute a mold cavity, in a configuration adopted during the mold closure movement.

A rigid core 1 according to the first embodiment is shown on FIGS. 1 and 2. A plurality of circumferentially adjacent fractions 10d, 10i can be seen, disposed side by side in contact with one another by their transverse faces 10d1 and 10i1. The transverse faces 10i1 of at least one fraction 10i converge at the exterior of the core to allow removal of said core by raising this fraction radially through the interior. In practice and as illustrated in the patent application EP 0 242 840 and in the present application, the core comprises two models of fraction: divergent fractions 10d of which the transverse faces 10d1 diverge at the exterior of the core and so-called "inverted" fractions 10i of which the transverse faces 10i1 converge at the exterior of the core. The fractions will be designated hereinafter while omitting the suffix i or d, for example "fraction 10" if their divergent or inverted nature is immaterial to the technical feature being dealt with.

Each of said fractions 10 comprises a portion 12 for attachment to a rim 14, said attachment portion 12 being arranged at the radially internal end of each of the fractions. It can be seen in FIG. 1 that the rim 14 is circumferentially continuous. On the other hand, since the attachment portions 12 form part of the fractions 10, they are only developed over a portion of a circle. Said attachment portion 12 is essentially produced from a first material selected for its ability to withstand a large number of mounting and removal cycles. Each of said fractions 10 comprises a main portion 13 integrally connected to said attachment portion 12 of which the essential role is to define a surface for manufacture of the tire. This main portion 13 is essentially produced from a second material different from the first material selected for its moldability, good thermal conductivity and lightness, integrally connected to said attachment portion 12, in other words not functionally removable.

FIG. 1 shows a fraction 10 having an attachment portion 12 and a main portion 13 is shown, the attachment portion 12 being mounted on a rim 14. The core 1 cooperates with a shell 15 (one shell for each sidewall) to define a mold cavity. An intermediate face 11 can be seen, disposed in the direct extension of the molding surface on the fraction 10 and radially inwardly. This intermediate face 11 is located radially beneath the molding portion of the fraction 10 and either is disposed in a plane perpendicular to the axis of rotation (as illustrated) or is formed as a cone with a very large, very open angle. Therefore, if crude rubber is pushed by the extension 150, thus initiating the creation of a flash, during the closure movement of the mold around a crude tire blank, the flash will be pinched between the points P1 and P2 and will not be sheared off. A pinched flash obviously remains attached to the tire.

Also and preferably, the joining line L2 between the attachment portion 12 and the main portion 13 is accommodated in this intermediate surface 11, and this also prevents the appearance of a flash on the internal surface of the tire bead owing to the creep of the rubber between attachment portion and main portion.

It should also be noted that, when the core is used during the vulcanization of a tire, there must only be a very small clearance between each of the fractions so as to prevent the appearance of excessive molding flashes. Furthermore, a core of this type, which comprises parts with different coefficients of thermal expansion (steel for the attachment portion and aluminum for the main portion) should accommodate the thermal cycles caused by the production of a tire. A core of this type will be employed at temperatures of about 150° C., at least during vulcanization, whereas temperatures lower than 100° C. are employed during manufacture of the crude tire blank. To accommodate these thermal cycles, the dimensioning of the main portion 13 and its joint to its attachment portion 12 are such that, when the core is used during the assembly of a crude tire, clearances remain between each of the fractions 10i and 10d which close again only during the rise in temperature necessary for vulcanization. This prevents the divergent fractions 10i from being expelled radially outwardly owing to the increase in the perimeter of the main portions, itself due to thermal expansion.

Correlatively, this prevents degradation of the joining means (the attachment portions and the rim) joining the fractions 10 to one another.

It has been seen that a fraction 10 always comprises an attachment portion 12 disposed radially in the interior portion thereof. It comprises a main portion 13 produced from molded light alloy. FIG. 3 shows a main portion 13 fixed to an attachment portion 12 by means of screws 16 disposed laterally on either side of the fraction 10 and circumferentially substantially in the median portion of the fraction. A connection of this type between attachment portion 12 and main portion 13, as it is essentially central, will allow the main portion to undergo greater expansions than the attachment portion without damaging the attachment portion 12, the main portion 13 or the joining screws 16 between attachment portion and main portion. It is shown that the attachment portion 12 comprises two noses 17 that cooperate with corresponding noses 18 arranged on the rim 14, and with the cylindrical bearing surface between the noses 17, for maintaining the different fractions 10 centered on the rim.

It will be appreciated that the attachment bearing surfaces are markedly stressed during each mounting and each removal of the core. This portion is very strong owing to the choice of a suitable material. Furthermore, all appropriate surface treatments can be provided specifically to ensure the durability of this zone which is subjected to many impacts, hammering and friction during each core mounting and removal cycle.

In FIG. 4, it is shown that the joining line L5 separating attachment portion 12 and main portion 13 would appear in the intermediate surface 11. The internal face of the bead B of the tire is molded entirely by the main portion 13. In this case, it may be advantageous if the face P3, which is cylindrical in FIG. 4, is slightly frustoconical. It is not necessary that the attachment portion be continuous circumferentially, as it is shown with parts 121 and 122 in FIG. 5, as this portion has no molding function, the molding surface being entirely on the main portions 13.

It has been seen that a metal such as steel is typically used to produce the attachment portion. The steel is machined so as to obtain all the bearing surfaces and the forms desired for this attachment portion as a function of the core attachment and handling applications. It has been seen that a cast light alloy such as an aluminum alloy is typically used for the main portion. This allows electrical resistors to be over-molded—in other words immersed—within the wall forming the radially external dome of each main portion.

Figure 6:
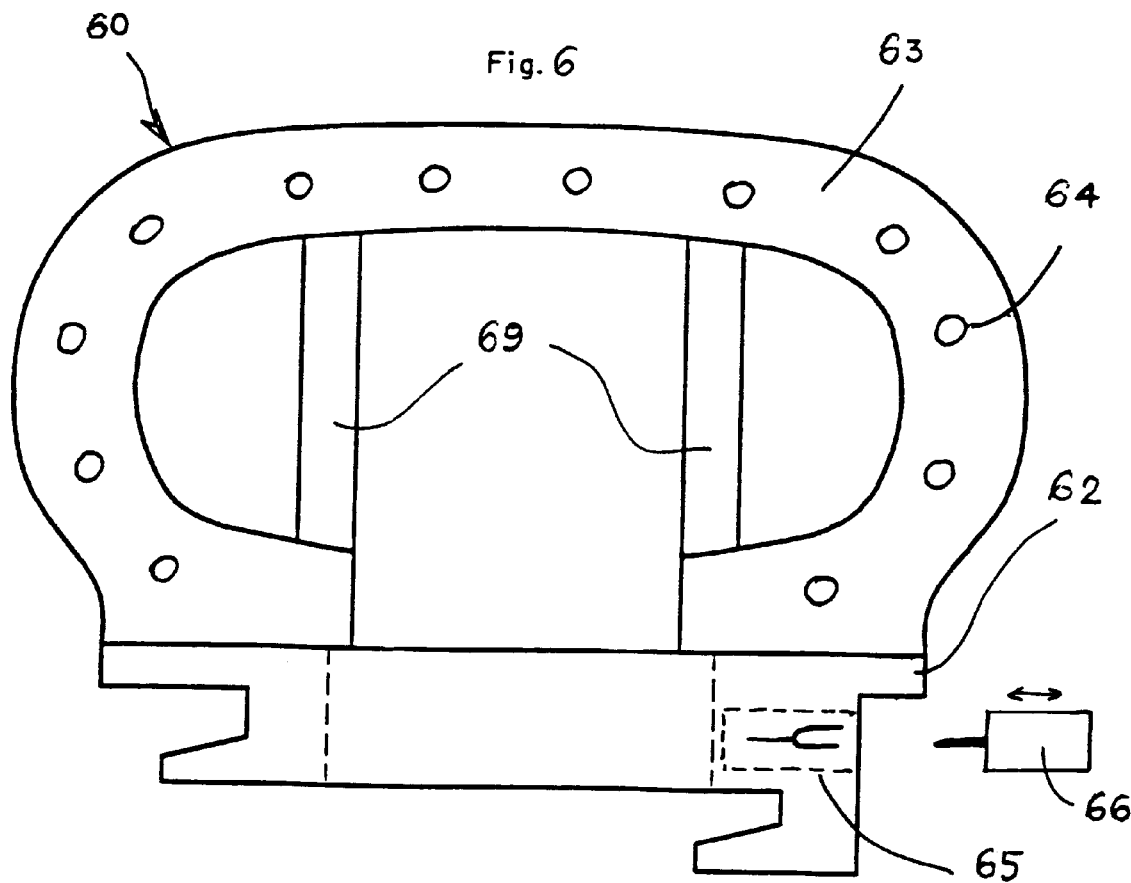
FIG. 6 is a radial section illustrating a further feature of the invention.

FIG. 6 shows an electrical resistor 64, the radial section revealing twelve sections of this resistor 64 which is curved so as to form to and from movements of the circumferentially orientated pieces. A pourable material which is a good conductor of heat is therefore used, the material being molded with at least one electrical resistor per fraction, immersed inside the wall forming the radially external dome of each main portion. In a variation, the resistors could also be fixed in a machined recess or fixed on the internal surface of said wall in a manner suitable for promoting the conduction of heat. As the core must be able to be conveyed from station to station on a tire manufacturing machine there is provided either a connector 65 which enables the core to be coupled by a further connector 66 to the vulcanization station of the machine, during the approach of a gripper to a vulcanization station, in order to supply the resistors with electric energy and optionally to allow connection of various measurement probes, or, for the same purpose, inductive coupling means and/or any other conventional coupling means.

FIG. 3 and 6 show an interesting aspect comprising a circumferentially continuous rim 14, the core comprising at least one fraction-side attachment bearing surface, arranged on the attachment portion of each of the fractions, for example on a circumferentially arranged nose 17. The core also comprises a rim-side attachment bearing surface which is complementary with the fraction-side attachment bearing surface, is arranged on the rim and cooperates, with regard to each fraction, with the fraction-side attachment bearing surface to absorb the stresses tending radially to separate the fractions relative to the rim, in cooperation with blocking means (not shown), for example means for pinching the rim 14 axially against the attachment portion 12. In the example illustrated, each rim-side attachment bearing surface is also produced on a circumferentially arranged nose 18.

Advantageously, said fraction-side attachment bearing surface and rim-side attachment bearing surface are configured so as to allow an axial movement of the rim relative to all the fractions in a single direction. This can be effected, for example, by situating the noses 17 at different levels on the fractions, one nose, the so-called lower nose being disposed radially at a lower level than the other, the so-called upper nose. The same applies to the noses 18 of the rim 14. It can also be seen in this example that each attachment bearing surface is a frustoconical surface, said frustoconical surfaces being orientated axially on the same side of the core. More particularly, each frustoconical surface has a non-wedging angle.

I claim:

1. A rigid core for molding and vulcanizing a tire and at least partially defining a manufacturing form for the internal surface of said tire, the core comprising a plurality of circumferentially adjacent rigid fractions having transverse faces, the fractions being disposed side by side in contact with one another by their transverse faces, said transverse faces of at least one fraction converging radially at the exterior of the core, each of said fractions comprising a rigid portion for attachment to a member for integrally connecting the plurality of fractions, said attachment portion being arranged at the radially internal end of each of the fractions and being produced from a first material, each fraction further comprising a main portion which is integrally connected to said attachment portion and is produced from a second material different from the first material, said manufacturing form for the internal surface of the tire being defined at least in part by the external surfaces of said main portions and by no part of said attachment portions.

2. A core according to claim 1, in which said manufacturing form is extended radially toward the smallest radii by a non-molding intermediate face bordering said manufacturing form, said intermediate face being contained in a plane perpendicular to the axis or having a frustoconical form, said intermediate face being intended to cooperate with a corresponding face located in the extension of a zone for the molding of a bead seat, said molding zone being located on a lateral shell, and in which a joining line located on said intermediate face separates the attachment portion and the main portion.

3. A core according to claim 2, in which a cylindrical centering bearing surface is located radially inwardly of said intermediate face.

4. A core according to claim 1, in which the attachment portions are produced from steel and the main portions are produced from aluminum alloy.

5. A core according to claim 1, in which a rim is used as a member for integrally connecting the plurality of fractions.

6. A core according to claim 1, in which, considering all the fractions, the dimensioning and configuration of the main portions, of the attachment portions and of the joint between the main portions and the attachment portions are such that, at the vulcanization temperature of the rubber, the main portions are in contact with one another with zero clearance and have a uniform molding surface, without a projection between adjacent fractions, whereas, at temperatures lower than the vulcanization temperature, clearances appear between the main portions.

7. A core according to claim 1, in which said main portions are molded with at least one electrical resistor per fraction, fixed so as to promote the conduction of heat.

8. A core according to claim 7, in which each main portion comprises a wall forming a radially external dome, and each electrical resistor is located within said wall.

9. A core according to claim 7, in which a connector is implanted, which, as a gripper approaches in a vulcanization station, allows the core to be coupled to the vulcanization station of a machine in order to supply the resistors with electrical energy.

10. A core according to claim 5, comprising:
at least one fraction-side attachment bearing surface, arranged on the attachment portion of each of the fractions,
a rim-side attachment bearing surface, complementary with the fraction-side attachment bearing surface, arranged on the rim and cooperating, for each fraction, with the fraction-side attachment bearing surface in order to absorb the stresses tending radially to separate the fractions relative to the rim.

11. A core according to claim 10, in which said fraction-side attachment bearing surface and rim-side attachment bearing surface are shaped so as to allow an axial movement of the rim relative to all of the fractions in a single direction.

12. A core according to claim 10, in which said fraction-side attachment bearing surface and rim-side attachment bearing surface are each located on a circumferentially arranged nose.

13. A core according to claim 9, in which said implanted connector enables the core to be connected to one or more measuring probes.

* * * * *